United States Patent [19]

Jokel

[11] Patent Number: 4,624,211

[45] Date of Patent: Nov. 25, 1986

[54] DEVICE FOR MARKING CARS

[76] Inventor: Isidore Jokel, 4021 Newport H, Deerfield Beach, Fla. 33441

[21] Appl. No.: 743,781

[22] Filed: Jun. 12, 1985

[51] Int. Cl.[4] .......................... B60Q 1/26; H01Q 1/12
[52] U.S. Cl. .................................. 116/209; 116/28 R; 343/894
[58] Field of Search ................ 343/894, 892; 116/173, 116/209

[56] References Cited

U.S. PATENT DOCUMENTS

| | | | |
|---|---|---|---|
| 3,075,492 | 1/1963 | Winfrey | 116/28 R |
| 3,433,203 | 3/1969 | Sharkey et al. | 116/28 R |
| 3,636,912 | 1/1972 | Kamp | 116/28 R |
| 3,712,263 | 1/1973 | Faragosa | 248/113 X |
| 3,899,843 | 8/1975 | Doyle et al. | 116/63 P X |
| 4,026,236 | 5/1977 | Robbins | 116/209 |
| 4,137,521 | 1/1979 | Martinez | 343/894 X |
| 4,144,833 | 3/1979 | Newman, Sr. | 116/173 X |
| 4,460,896 | 7/1984 | Shmitka | 343/894 X |

Primary Examiner—Daniel M. Yasich
Attorney, Agent, or Firm—Victor F. Volk

[57] ABSTRACT

A device for attaching an identifying display to the antenna of a car in a parking lot has a threaded rod with a lengthwise channel that fits over the stem of the antenna, a lower nut that confines the stem in the channel, an upper threaded sleeve that fits over the enlarged tip of the antenna, and a screw that fits into the top of the sleeve. A ribbon or flag can be tied through a vertical slot in the top of the screw or a rigid display member can be threaded onto it.

5 Claims, 6 Drawing Figures

U.S. Patent   Nov. 25, 1986   4,624,211
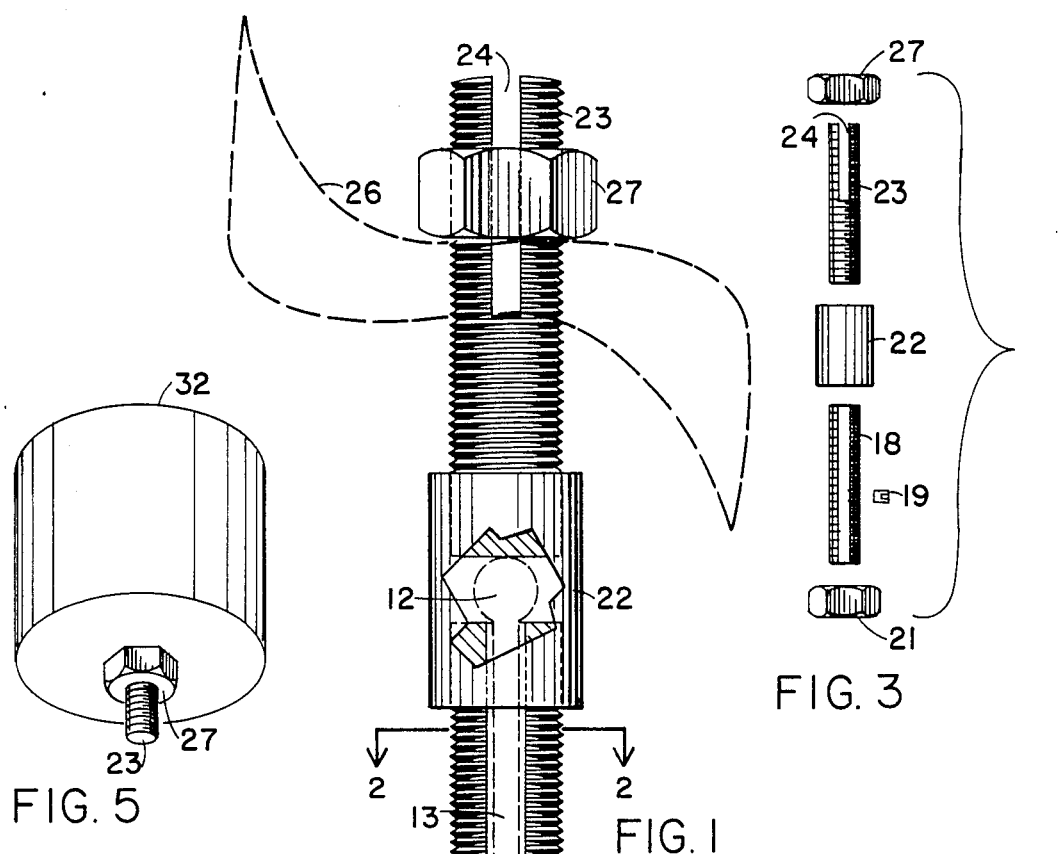

DEVICE FOR MARKING CARS

BACKGROUND OF THE INVENTION

When auto cars are parked in a large parking lot it is often useful to identify or mark them in some way that will permit them to be located quickly, or identified by a third party. Almost all cars bear radio antennas to which it might be convenient to attach some identifying ribbon or flag, but when attempts have been made to tie a ribbon directly to the antenna as often as not, since the antenna stems are usually smooth and highly polished, after short while the ribbon will be found to have slid down to the car hood and out of sight. The antenna, itself, is particularly unsuited for attachment of a ribbon or other ornament when it is considered that, either deliberately or inadvertently, the marker may be left in place when the car is driven.

SUMMARY OF THE INVENTION

I have invented a device for locking a flag or other display onto an automobile antenna that has an enlarged tip at the top of an elongated stem. My device comprises a rodlike member with walls that define a lengthwise channel that is large enough to encompass the stem but small enough to reject the tip. Lower band means surround the rodlike member to confine the stem within the channel and upper band means surround both the rodlike member and its tip. Means are also comprised for locking the tip within the upper band means.

Advantageously, my rodlike member may comprise an external thread and my lower and upper band means comprise matching internal threads while the locking means comprises screw means that fit the internal threads and also a slotted upper portion for receiving a flaglike display.

Advantageously, also, my device may comprise a nut that is threadable over the upper portion of my locking means to lock in the display or attach a rigid display that is bonded to the nut. In a preferred embodiment my rodlike member comprises pressure means, such as a set screw, to contact the stem and prevent relative vibration. By bonding a rigid or partially rigid display to the nut that fits my locking means such a display can be firmly fixed to my device, as also it may be if it has a tapped hole in the display wall to fit the screw means.

BRIEF DESCRIPTION OF THE DRAWING

FIG. 1 shows a partially cut-away view of my invention.

FIG. 2 shows a section through the line 2—2 of FIG. 1.

FIG. 3 shows an exploded view of the device of my invention.

FIG. 4 shows a flag as the display of my invention.

FIG. 5 shows a rigid display with my invention.

FIG. 6 shows another rigid display with my invention.

DETAILED DESCRIPTION OF PREFERRED EMBODIMENTS

Referring first to FIG. 1 showing my device 10 a conventional automobile radio antenna 11 has an enlarged tip 12 in the form of a sphere on an elongated stem 13. The stem fits into a channel 14 formed by milled walls 16, 17 in a threaded rod 18. However the channel 14 is not wide enough to accept the tip 12 which thus constitutes an upper block against vertical movement of the rod 18. As a further preventive of movement of the rod 18 relative to the stem 13 a setscrew 19 is threaded through a wall of the rod 18. This is particularly useful to prevent vibration when the car to which my device is attached is moving. To confine the stem 13 within the slot 14 a band in the form of a nut 21 is threaded onto the rod 18 near the bottom of the rod, and an internally threaded sleeve 22, with an internal diameter sufficient to fit over the tip 12 is threaded over the top of the rod 18. A machine screw 23 is threaded into the top of the sleeve 22 down to the tip 12 and combines with the top of the rod 18 to lock the device 10 to the antenna 11.

The screw 23 has a deep vertical slot 24 into which a marker ribbon 26 can conveniently be inserted. A nut 27 can then be turned down on the screw 23 to grip the ribbon 26. A flag 28 can replace the ribbon 26 by having its upper string 29 tied through the slot 24 (FIG. 4) and its lower string 31 tied around the stem 13. When a rigid marker is desired instead of a fabric ribbon or flag a marker such as the metal cylinder 32 can be brazed to the nut 27 and then turned onto the screw 23 (FIG. 5). Where a wall of a rigid marker 33 (FIG. 6) is thick enough a threaded hole 34 can be tapped through it to take the screw 23.

From the above description it is clear that I have made a practical solution to the need for a reliable means of marking cars in a parking lot so that they can be easily located and identified without danger of having the marking means drop off or slip. The above description has been exemplary rather than definitive of my invention for which I desire an award of Letters Patent as defined in the appended claims.

I claim:

1. A device for positively locking a flag or other display onto an automobile antenna having an enlarged tip at the top of an elongated stem comprising:
    (A) an externally threaded rodlike member comprising walls defining a lengthwise channel, said channel being large enough to accept said stem and small enough to reject said tip,
    (B) lower nut means surrounding said rodlike member for confining said stem within said channel,
    (C) internally threaded sleeve means threaded onto said rodlike member and surrounding said said tip, and
    (D) a screw threaded into the top of said sleeve down upon said tip thereby locking said tip into said sleeve.

2. The device of claim 1 wherein said screw comprises a slotted upper portion for receiving a flag-like display, and comprising an upper nut means threadable over said portion to lock in said display.

3. The device of claim 1 wherein said rodlike member comprises a set screw through a wall thereof contacting said stem.

4. The device of claim 1 comprising upper nut means fitting said screw and a display, said display being bonded to said upper nut means.

5. The device if claim 1 comprising a display comprising a rigid element comprising a tapped hole thread onto said said screw.

* * * * *